US009780613B2

United States Patent
Yamaguchi et al.

(10) Patent No.: US 9,780,613 B2
(45) Date of Patent: Oct. 3, 2017

(54) PERMANENT MAGNET ROTOR WITH INNER AND OUTER CIRCUMFERENTIAL INCLINED RIBS

(71) Applicant: HONDA MOTOR CO., LTD., Tokyo (JP)

(72) Inventors: Tadashi Yamaguchi, Wako (JP); Masashi Inoue, Wako (JP); Yoshihisa Matsuoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 154 days.

(21) Appl. No.: 14/178,169

(22) Filed: Feb. 11, 2014

(65) Prior Publication Data

US 2014/0225470 A1  Aug. 14, 2014

(30) Foreign Application Priority Data

Feb. 14, 2013 (JP) ................................. 2013-026937

(51) Int. Cl.
*H02K 1/27* (2006.01)
*H02K 1/30* (2006.01)

(52) U.S. Cl.
CPC ............ *H02K 1/2766* (2013.01); *H02K 1/30* (2013.01); *H02K 1/274* (2013.01); *H02K 1/2706* (2013.01); *H02K 1/276* (2013.01)

(58) Field of Classification Search
CPC ........ H02K 1/27; H02K 1/2706; H02K 1/272; H02K 1/274; H02K 1/276; H02K 1/30; H02K 2213/03; H02K 1/2766

(Continued)

(56) References Cited

U.S. PATENT DOCUMENTS

2003/0011265 A1* 1/2003 Hattori ................. H02K 1/2766
                                                    310/156.38
2012/0256516 A1* 10/2012 Matsushita .............. H02K 1/28
                                                    310/216.123

FOREIGN PATENT DOCUMENTS

CN       102714437      10/2012
JP       3746885 B2     4/1999
                    (Continued)

OTHER PUBLICATIONS

JP 2004194419 A (English Translation).*
(Continued)

*Primary Examiner* — Michael Andrews
*Assistant Examiner* — Alexander Moraza
(74) *Attorney, Agent, or Firm* — Mori & Ward, LLP

(57) ABSTRACT

A rotor includes a rotor core, a plurality of permanent magnets, and a rotating shaft. The rotor core includes a through-hole, an inner circumference-side rotor core, an outer circumference-side rotor core, an annular portion, a plurality of inner circumference-side ribs, and a plurality of outer circumference-side ribs. The through-hole is provided on a first inner circumference side of magnet insertion holes. The inner circumference-side rotor core is located on a second inner circumference side of the through-hole. The outer circumference-side rotor core is located on an outer circumference side of the through-hole. The annular portion has a substantially annular shape, and is being provided inside the through-hole. The plurality of inner circumference-side ribs connect the inner circumference-side rotor core and the annular portion and are provided at predetermined intervals in a circumferential direction.

12 Claims, 14 Drawing Sheets

(58) Field of Classification Search
USPC ..... 310/156.53, 156.57, 216.053, 60 A, 420, 310/421
See application file for complete search history.

(56) References Cited

FOREIGN PATENT DOCUMENTS

| | | | |
|---|---|---|---|
| JP | 2003-18775 | | 1/2003 |
| JP | 2003018775 A | * | 1/2003 |
| JP | 2004-194419 | | 7/2004 |
| JP | 2004194419 A | * | 7/2004 |
| JP | 3746885 B2 | * | 2/2006 |
| JP | 2012-75208 | | 4/2012 |
| WO | WO 2011/077522 | | 6/2011 |

OTHER PUBLICATIONS

JP 3746885 B2 (English Translation).*
Chinese Office Action for corresponding CN Application No. 201410046098.4, Dec. 16, 2015 (w/ English translation including machine translation).
Japanese Office Action for corresponding JP Application No. 2013-026937, Aug. 30, 2016 (w/ English machine translation).

\* cited by examiner

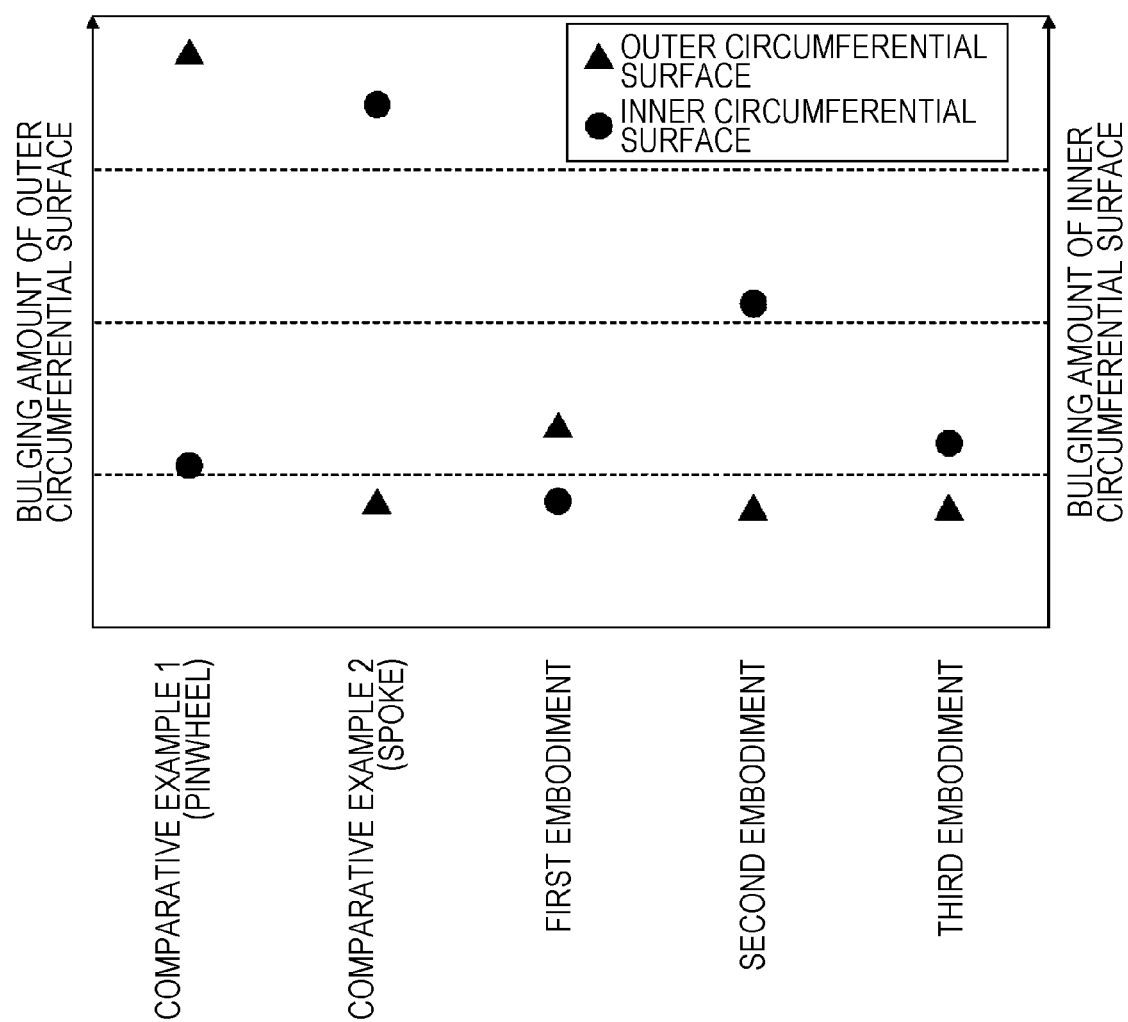

BACKGROUND ART

BACKGROUND ART

PERMANENT MAGNET ROTOR WITH INNER AND OUTER CIRCUMFERENTIAL INCLINED RIBS

CROSS-REFERENCE TO RELATED APPLICATIONS

The present application claims priority under 35 U.S.C. §119 to Japanese Patent Application No. 2013-026937, filed Feb. 14, 2013, entitled "Rotor for Rotating Electric Machine." The contents of this application are incorporated herein by reference in their entirety.

BACKGROUND

1. Field

The present disclosure relates to a rotor for a rotating electric machine.

2. Description of the Related Art

In related art, as a rotor for use in a rotating electric machine, there exists a rotor having a plurality of permanent magnets arranged in a rotor core at predetermined intervals in the circumferential direction (see, for example, Japanese Patent No. 3746885 and Japanese Unexamined Patent Application Publication No. 2004-194419).

As illustrated in FIG. 13, a rotor 100 described in Japanese Patent No. 3746885 includes a rotor core 101. The rotor core 101 has an inner circumferential portion 103 that surrounds a shaft press-fit hole 102, a plurality of ribs 104 that extend outwards from the inner circumferential portion 103, and an outer circumferential portion 105 that connects the distal ends of the ribs 104.

The plurality of ribs 104 are inclined by a predetermined angle in the circumferential direction, and have a so-called pinwheel configuration. This configuration reduces distortion of the ribs 104 in the axial direction.

As illustrated in FIG. 14, a rotor 221 described in Japanese Unexamined Patent Application Publication No. 2004-194419 has a rotor core 222. The rotor core 222 has an outer circumferential portion 222b, an inner circumferential portion 222c, and a plurality of ribs 222d that connect the outer circumferential portion 222b and the inner circumferential portion 222c. In addition, a rotating shaft 224 is fitted and secured into a shaft hole 222a in the center portion of the rotor core 222, and a plurality of permanent magnets 226 are bonded and secured to the outer circumferential surface.

The plurality of ribs 222d are arranged so as to be inclined at an angle α in directions opposite to each other in the circumferential direction, so that adjacent ribs 222d are symmetrical to each other. By arranging the plurality of ribs 222d in a so-called spoke configuration in this way, the strength of the ribs 222d is improved, and the width of the ribs 222d is reduced (narrowed), thereby reducing the weight of the rotor core 222.

SUMMARY

According to one aspect of the present disclosure, a rotor for a rotating electric machine includes a rotor core, a plurality of permanent magnets, and a rotating shaft. The rotor core has a substantially annular shape and includes a rotation axis around which the rotor core is to be rotated. The rotor core includes a shaft hole extending along the rotation axis and a plurality of magnet insertion holes provided at predetermined intervals in a circumferential direction of the rotor core. The plurality of permanent magnets are provided in the plurality of magnet insertion holes, respectively. The rotating shaft is press-fitted into the shaft hole provided in the rotor core. The rotor core includes a through-hole, an inner circumference-side rotor core, an outer circumference-side rotor core, an annular portion, a plurality of inner circumference-side ribs, and a plurality of outer circumference-side ribs. The through-hole is provided on a first inner circumference side of the magnet insertion holes. The through-hole has a substantially annular shape and penetrates the rotor core along the rotation axis. The inner circumference-side rotor core is located on a second inner circumference side of the through-hole. The outer circumference-side rotor core is located on an outer circumference side of the through-hole. The annular portion has a substantially annular shape. The annular portion is being provided inside the through-hole. The plurality of inner circumference-side ribs connect the inner circumference-side rotor core and the annular portion and are provided at predetermined intervals in the circumferential direction. The plurality of outer circumference-side ribs connect the outer circumference-side rotor core and the annular portion and are provided at predetermined intervals in the circumferential direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 6 illustrates the amounts of bulging of the inner circumferential surface of an inner circumference-side rotor core, and the outer circumferential surface of an outer circumference-side rotor core, to the outer circumference side;

DESCRIPTION OF THE EMBODIMENTS

Figure 1:
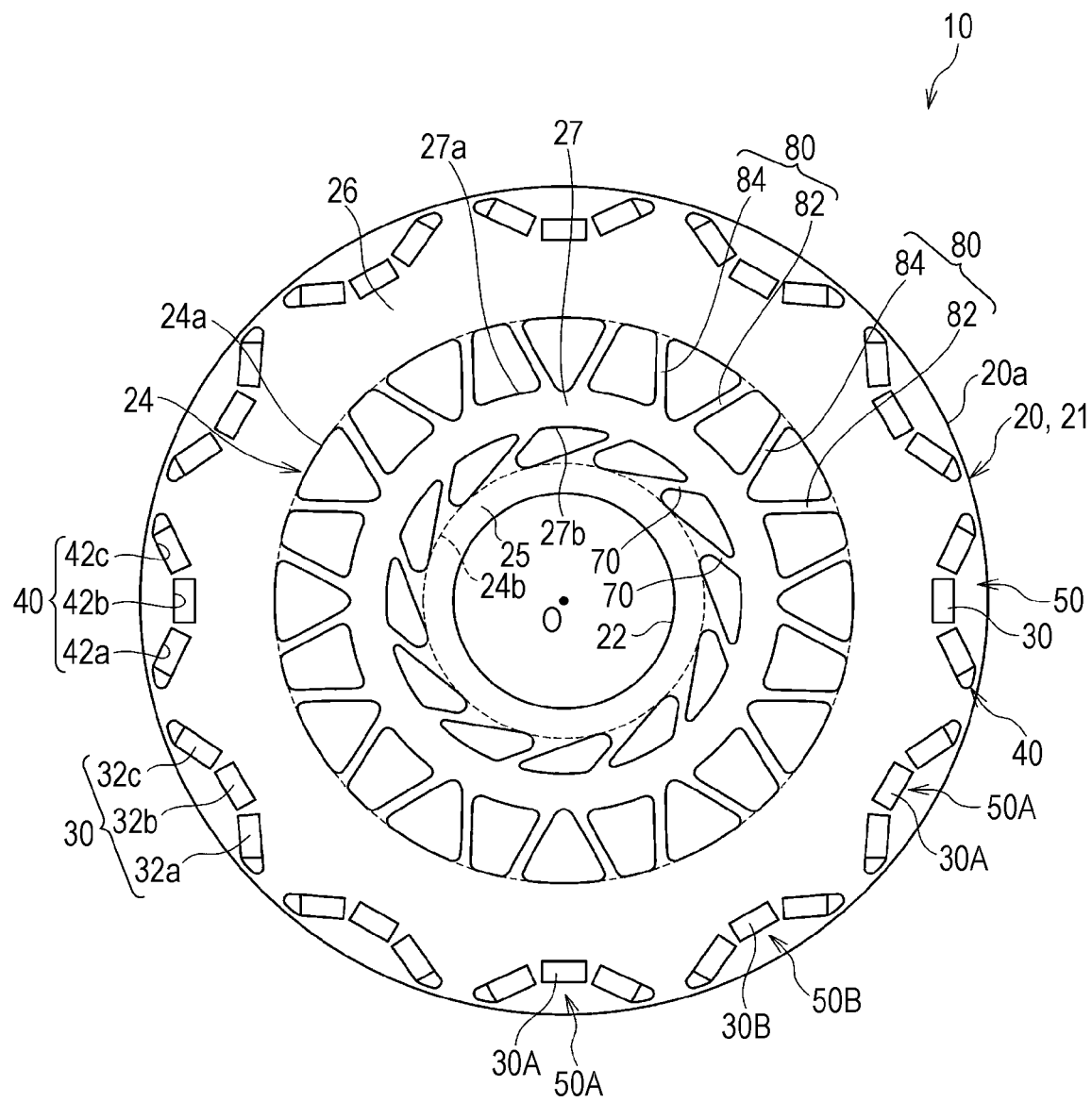
FIG. 1 is a front view of a rotor according to a first embodiment.

The embodiments will now be described with reference to the accompanying drawings, wherein like reference numerals designate corresponding or identical elements throughout the various drawings.

Hereinafter, a rotor for a rotating electric machine according to various embodiments of the present disclosure will be described.

First Embodiment

Figure 2:
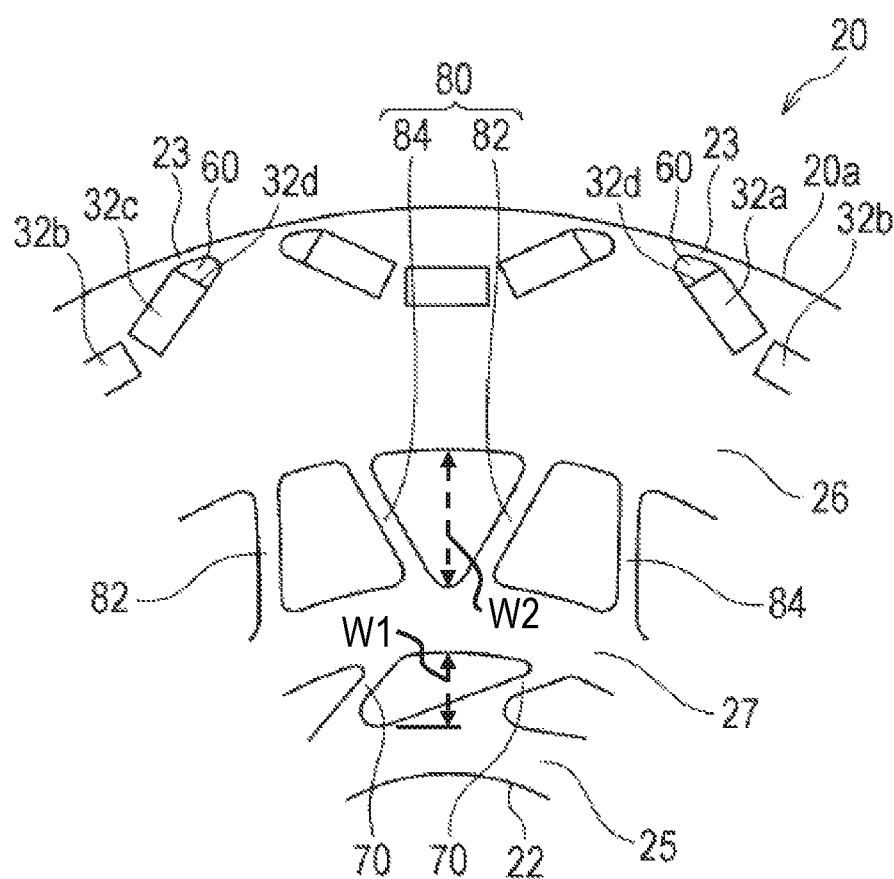
FIG. 2 is a partial enlarged view of the rotor illustrated in FIG. 1.

As illustrated in FIGS. 1 and 2, a rotor 10 for a rotating electric machine according to a first embodiment includes a rotor core 20, and a rotating shaft (not illustrated). The rotor core 20 is substantially annular-shaped, and has a plurality of magnetic pole portions 50 that are formed at predetermined intervals in the circumferential direction. The rotating shaft is press-fitted into a shaft hole 22 formed in the central portion of the rotor core 20. The rotor 10 is arranged on the inner circumference side of a stator (not illustrated). In FIG. 1, symbol O denotes the center of the rotor 10.

The rotor core 20 is formed by laminating a number of annular silicon steel sheets 21 having substantially the same shape. The rotor core 20 has a plurality of magnet insertion holes 40 formed at predetermined intervals in the circumferential direction.

The magnetic pole portions 50 have a permanent magnet 30 inserted into each of the magnet insertion holes 40 so as to be magnetized in the radial direction, and alternately differ in magnetization direction in the circumferential direction. More specifically, in a magnetic pole portion 50A having a permanent magnet 30A inserted in each of the magnet insertion holes 40, provided that its outer circumference side is the N-pole, in a magnetic pole portion 50B adjacent to the magnetic pole portion 50A, a permanent magnet 30B is inserted in each of the magnet insertion holes 40 in such a way that its outer circumference side is the S-pole.

The permanent magnet 30 is divided in three in the circumferential direction, into three permanent magnet pieces 32a, 32b, and 32c. The permanent magnet pieces 32a, 32b, and 32c have the same substantially rectangular cross-sectional shape.

Each of the magnet insertion holes 40 is divided in three in the circumferential direction, into three voids 42a, 42b, and 42c. The permanent magnet pieces 32a, 32b, and 32c are inserted and secured into the three voids 42a, 42b, and 42c, respectively. The three voids 42a, 42b, and 42c are formed in a substantially V-shape so that the outer circumferential surfaces of the permanent magnet pieces 32a, 32b, and 32c that are adjacent to each other in the circumferential direction form an angle of less than 180° to each other.

The rotor core 20 also has a side barrier portion 60 (see FIG. 2) formed in a portion of the rotor core 20 which is adjacent to a circumferentially outer side end face 32d of each of the permanent magnet pieces 32a and 32c. The side barrier portion 30 penetrates the rotor core 20 in the axial direction to define a magnetic gap. Because the rotor core 20 has the side barrier portion 60 formed in this way, a circumferential rib 23 extending in the circumferential direction is provided between the side barrier portion 60 and an outer circumferential surface 20a of the rotor core 20.

The circumferential rib 23 has a relatively short width in the radial direction. This prevents the magnetic flux generated from the outer circumferential surface of the permanent magnet 30 from short-circuiting to the inner circumferential surface of the same permanent magnet 30 via the circumferential rib 23, or from short-circuiting to the inner circumferential surface of the permanent magnet 30 forming the adjacent magnetic pole portion 50 via the circumferential rib 23.

In the rotor core 20, a through-hole 24 is formed on the inner circumference side of the magnet insertion holes 40. The through-hole 24 has a substantially annular shape, and penetrates the rotor core 20 in the axial direction. The through-hole 24 has an inner circumferential surface 24a and an outer circumferential surface 24b indicated by two circumferential dotted lines in FIG. 1. The inner circumferential surface 24a and the outer circumferential surface 24b are parallel to the outer circumferential surface 20a and the shaft hole 22 of the rotor core 20. Because the through-hole 24 is formed in this way, the rotor core 20 has an inner circumference-side rotor core 25 located on the inner circumference side of the through-hole 24, and an outer circumference-side rotor core 26 located on the outer circumference side of the through-hole 24.

An annular portion 27 having a substantially annular shape is formed inside the through-hole 24. An outer circumferential surface 27a and an inner circumferential surface 27b of the annular portion 27 are in parallel to the outer circumferential surface 20a and the shaft hole 22 of the rotor core 20.

The inner circumference-side rotor core 25 and the annular portion 27 are connected by a plurality of inner circumference-side ribs 70 that are arranged at predetermined intervals in the circumferential direction. The outer circumference-side rotor core 26 and the annular portion 27 are connected by a plurality of outer circumference-side ribs 80 that are arranged at predetermined intervals in the circumferential direction.

The inner circumference-side ribs 70 are inclined by a predetermined angle so as to extend to one side in the circumferential direction (right side in FIG. 2), from the inner circumferential-side rotor core 25 toward the annular portion 27. The plurality of inner circumference-side ribs 70 have a so-called pinwheel configuration as a whole.

Each of the outer circumference-side ribs 80 has a first outer circumference-side rib 82, and a second outer circumference-side rib 84. The first outer circumference-side rib 82 extends to one side in the circumferential direction (right side in FIG. 2) from the annular portion 27 toward the outer circumference-side rotor core 26. The second outer circumference-side rib 84 extends to the other side in the circumferential direction (left side in FIG. 2), from the annular portion 27 toward the outer circumference-side rotor core 26. The outer circumference-side ribs 80 that are adjacent to each other in the circumferential direction are separated by a predetermined spacing so that the first outer circumference-side rib 82 constituting one outer circumference-side rib 80 and the second outer circumference-side rib 84 constituting the other outer circumference-side rib 80 do not cross each other.

In this way, the plurality of outer circumference-side ribs 80 have a so-called spoke configuration, with the result that the rigidity of the outer circumference-side ribs 80 against a pulling force directed toward the outer circumference side is higher than the rigidity of the inner circumference-side ribs 70 against a pulling force directed toward the outer circumference side. In addition, a radial width W1 of the inner circumference-side ribs 70 is set shorter than a radial width W2 of the outer circumference-side ribs 80 (see, e.g., FIG. 2).

Next, for the purpose of comparison between the rotor core 20 according to the first embodiment, and rotor cores 320 and 420 according to Comparative Examples 1 and 2, respectively, an analysis was conducted on displacement of each of the rotor cores 20, 320, and 420 during rotation.

Figure 4A:
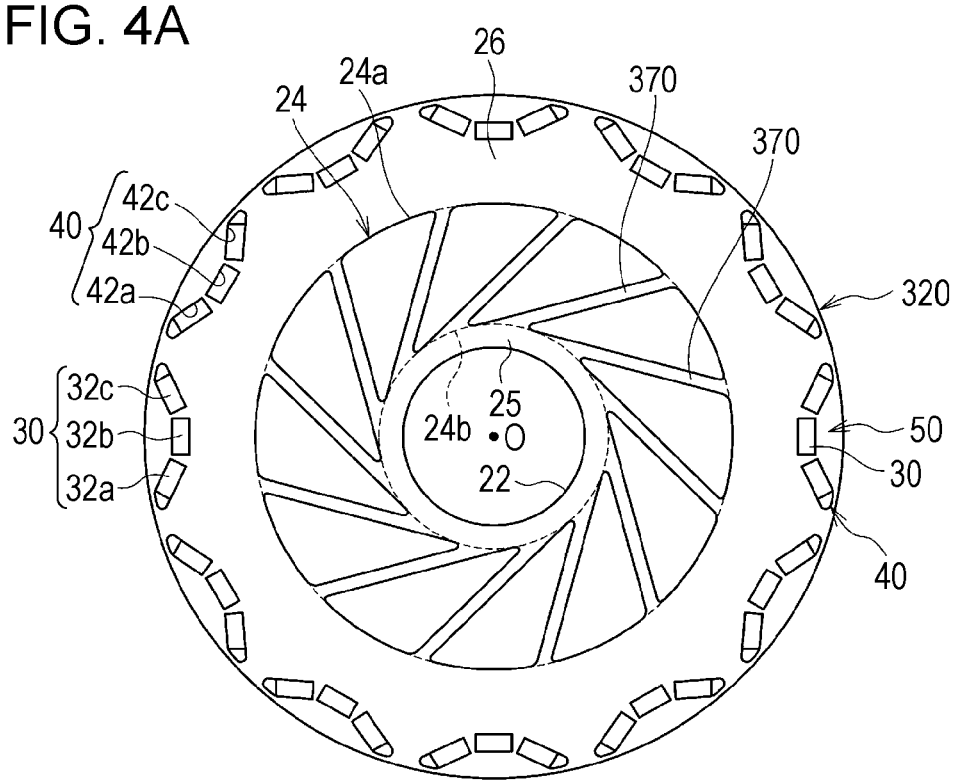
FIG. 4A is a front view of a rotor according to Comparative Example 1.

As illustrated as FIG. 4A, the rotor core 320 according to Comparative Example 1 has the same basic configuration as the rotor core 20 according to the first embodiment, and differs from the rotor core 20 in that the rotor core 320 does not have the annular portion 27, the inner circumference-side ribs 70, and the outer circumference-side ribs 80. In the rotor core 320, the inner circumference-side rotor core 25 and the outer circumference-side rotor core 26 are connected by a plurality of ribs 370 that are arranged at predetermined intervals in the circumferential direction. The ribs 370 extend so as to be inclined to one side in the circumferential direction (clockwise in FIG. 4A), from the inner circumference-side rotor core 25 toward the outer circumference-side rotor core 26. Therefore, the plurality of ribs 370 are formed in a so-called pinwheel configuration, and have a relatively low rigidity.

Figure 5A:
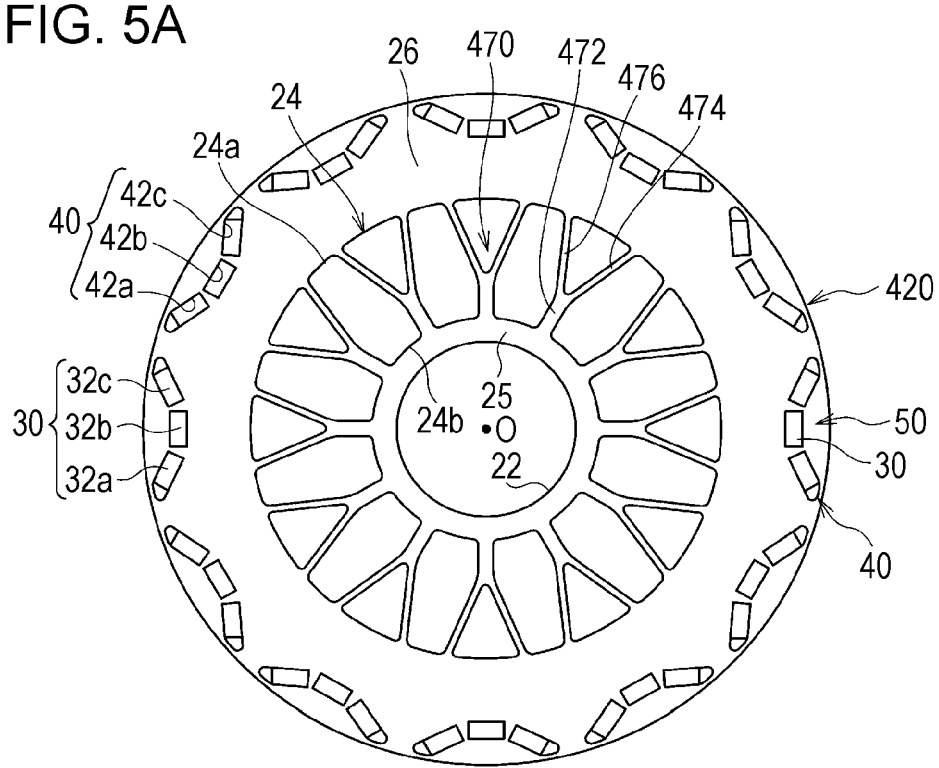
FIG. 5A is a front view of a rotor according to Comparative Example 2.

As illustrated in FIG. 5A, like the rotor core 320 according to Comparative Example 1, the rotor core 420 according to Comparative Example 2 also has the same basic configuration as the rotor core 20 according to the first embodiment, and differs from the rotor core 20 in that the rotor core 420 does not have the annular portion 27, the inner circumference-side ribs 70, and the outer circumference-side ribs 80. In the rotor core 420, the inner circumference-side rotor core 25 and the outer circumference-side rotor core 26 are connected by a plurality of ribs 470 that are arranged at predetermined intervals in the circumferential direction. Each of the ribs 470 includes a first rib 472, a second rib 474, and a third rib 476. The first rib 472 extends in the radial direction from the inner circumference-side rotor core 25. The second rib 474 and the third rib 476 extend in the radial direction from the outer circumference-side end portion of the first rib 472. The second rib 474 and the third rib 476 are inclined to one side and the other side, respectively, in the circumferential direction, and are connected to the outer circumference-side rotor core 26. Therefore, the plurality of ribs 470 have a so-called spoke configuration, and have a relatively high rigidity.

Figure 3:
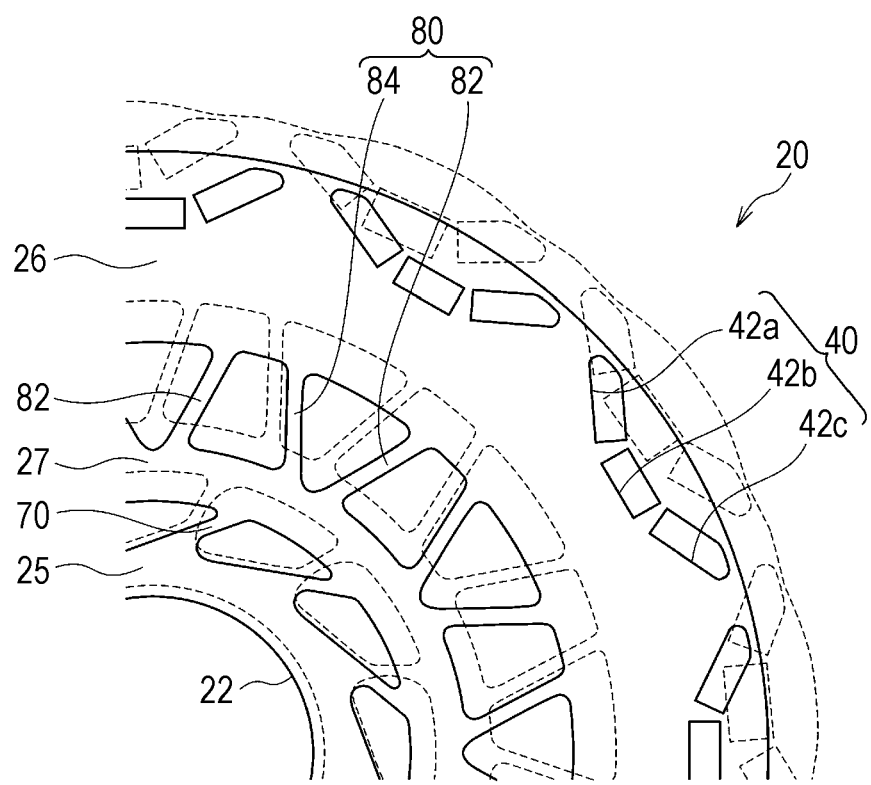
FIG. 3 illustrates displacement of a rotor core according to the first embodiment.
Figure 4B:
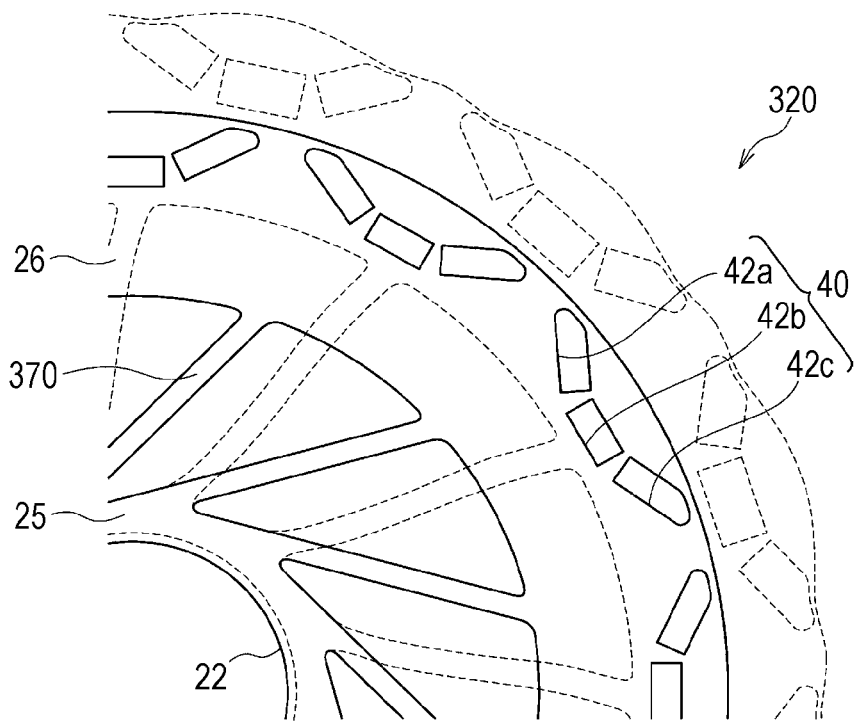
FIG. 4B illustrates displacement of a rotor core.
Figure 5B:
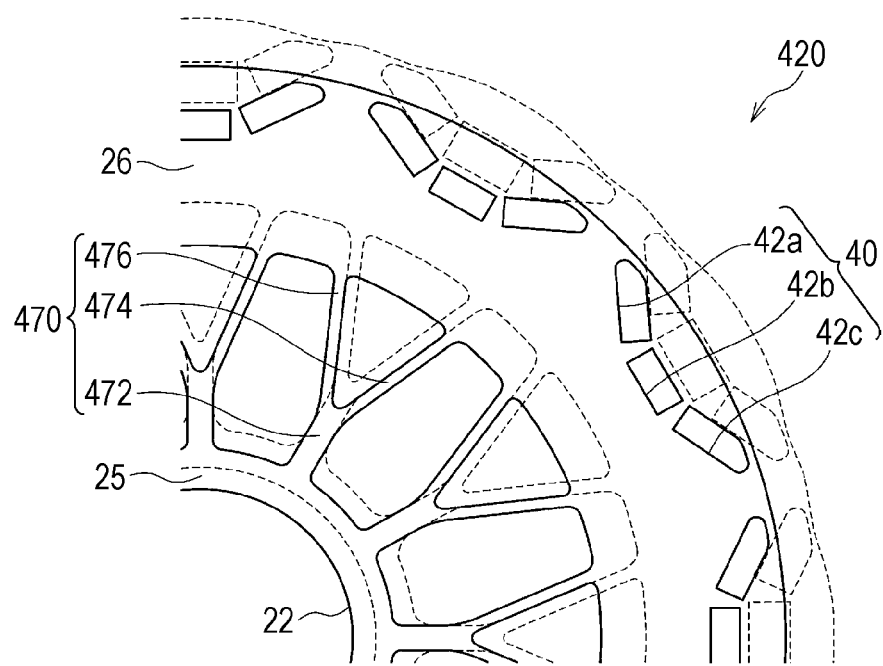
FIG. 5B illustrates displacement of a rotor core.

FIGS. 3, 4B, and 5B illustrates the results obtained by simulation for displacement of each of the rotor cores 20, 320, and 420 according to the first embodiment, Comparative Example 1, and Comparative Example 2, respectively, during rotation. In FIGS. 3, 4B, and 5B, solid lines and broken lines indicate the rotor core 20, 320, or 420 before rotation and during rotation, respectively.

FIG. 6 illustrates the amounts of bulging of the inner circumferential surface (shaft hole 22) of the inner circumference-side rotor core 25, and the outer circumferential surface (outer circumferential surface 20a) of the outer circumference-side rotor core 26, to the outer circumference side. In FIG. 6, the amount of bulging of the inner circumferential surface of the inner circumference-side rotor core 25, and the amount of bulging of the outer circumferential surface of the outer circumference-side rotor core 26 are represented by two vertical axes with different scales. The results for second and third embodiments in FIG. 6 will be described later.

It is appreciated from FIGS. 3 to 6 that the amount of bulging of the inner circumferential surface (shaft hole 22) of the inner circumference-side rotor core 25 to the outer circumference side is such that First Embodiment<Comparative Example 1<Comparative Example 2, and the amount of bulging of the outer circumferential surface of the outer circumference-side rotor core 26 to the outer circumference side is such that Comparative Example 2<First Embodiment<Comparative Example 1.

In this regard, the amount of bulging of the outer circumferential surface of the outer circumference-side rotor core 26 in Comparative Example 1, and the amount of bulging of the inner circumferential surface of the inner circumference-side rotor core 25 in Comparative Example 2 are very large, which may adversely affect rotor operation. To the contrary, in the first embodiment, both of these amounts of bulging are reduced in a well-balanced manner. The reason for these results will be discussed below.

In the case of the rotor core 320 according to Comparative Example 1, the ribs 370 have a relatively low rigidity. Consequently, the inner circumference-side rotor core 25 and the outer circumference-side rotor core 26 approach a state in which these portions are dynamically isolated from each other. Therefore, a large centrifugal force that acts on the outer circumference-side rotor core 26 during rotation is less likely to be transmitted to the inner circumference-side rotor core 25 via the ribs 370, thereby reducing bulging of the inner circumference-side rotor core 25 to the outer circumference side. However, the low rigidity of the ribs 320 means that when a large centrifugal force acts on the outer circumference-side rotor core 26, the outer circumference-side rotor core 26 bulges greatly toward the outer circumference side. As a result, a large centrifugal stress results from the deformation of the outer circumference-side rotor core 26.

In the case of the rotor core 420 according to Comparative Example 2, the ribs 470 have a relatively high rigidity. Therefore, bulging of the outer circumference-side rotor core 26 to the outer circumference side is reduced, and the centrifugal force exerted on the outer circumference-side rotor core 26 is reduced. However, the inner circumference-side rotor core 25 and the outer circumference-side rotor core 26 approach a state in which these portions are dynamically connected to each other. As a result, the centrifugal force that acts on the outer circumference-side rotor core 26 during rotation is transmitted to the inner circumference-side rotor core 25 via the ribs 470, causing the inner circumference-side rotor core 25 to bulge greatly to the outer circumference side.

As opposed to Comparative Examples 1 and 2 mentioned above, in the case of the rotor core 20 according to the first embodiment, the outer circumference-side ribs 80 connected to the outer circumference-side rotor core 26 have a higher rigidity than the inner circumference-side ribs 70. Therefore, bulging of the outer circumference-side rotor core 26 during rotation is reduced, and centrifugal stress generated in the outer circumference-side rotor core 26 is reduced.

The relatively large centrifugal force generated in the outer circumference-side rotor core 26 is transmitted to the annular portion 27 via the outer circumference-side ribs 80 that have a relatively high rigidity. In addition, a larger centrifugal force than that acting on the inner circumference-side rotor core 25 also acts on the annular portion 27 itself. At this time, because the inner circumference-side ribs 70 connecting the annular portion 27 and the inner circumference-side rotor core 25 have a rigidity lower than the rigidity of the outer circumference-side ribs 80, the inner circumference-side ribs 70 readily deform under a force that pulls the outer circumference-side rotor core 26 and the annular portion 27 toward the outer circumference side. Therefore, the relatively large centrifugal force acting on each of the outer circumference-side rotor core 26 and the annular portion 27 is less likely to be transmitted to the inner circumference-side rotor core 25, thereby reducing bulging of the inner circumference-side rotor core 25.

When the rotating shaft is press-fitted into the shaft hole 22, because the inner circumference-side ribs 70 have a lower rigidity and more readily deform than the outer circumference-side ribs 80, press-fit displacement is absorbed by the inner circumference-side ribs 70, and press-fit stress generated in the inner circumference-side rotor core 25 is less likely to be transmitted to the annular portion 27 and the outer circumference-side rotor core 26 via the inner circumference-side ribs 70. Therefore, it is possible to reduce press-fit stress generated in the outer circumference-side rotor core 26.

The radial width of the inner circumference-side ribs 70 is set shorter than the radial width of the outer circumference-side ribs 80. Therefore, during rotation, the inner circumference-side ribs 70 are allowed to readily deform under a force that pulls the outer circumference-side rotor core 26 and the annular portion 27 toward the outer circumference side, while reducing the amount of deformation of the inner circumference-side ribs 70 in the radial direction. As a result, bulging of the inner circumference-side rotor core 25 can be reduced, while reducing bulging of each of the annular portion 27 connected to the inner circumference-side ribs 70, and the outer circumference-side rotor core 26.

As described above, it became evident that the rotor core 20 according to the first embodiment can reduce both press-fit stress and centrifugal stress, and can reduce bulging of each of the inner circumference-side rotor core 25 and the outer circumference-side rotor core 26 to the outer circumference side in a well-balanced manner.

Second Embodiment

Next, a rotor for a rotating electric machine according to a second embodiment will be described. A rotor 10A for a rotating electric machine according to the second embodiment has the same basic configuration as the first embodiment, and differs from the first embodiment in the configurations of the inner circumference-side ribs 70 and outer circumference-side ribs 80. Accordingly, the same portions are denoted by the same symbols to omit or simplify the description of those portions.

Figure 7:
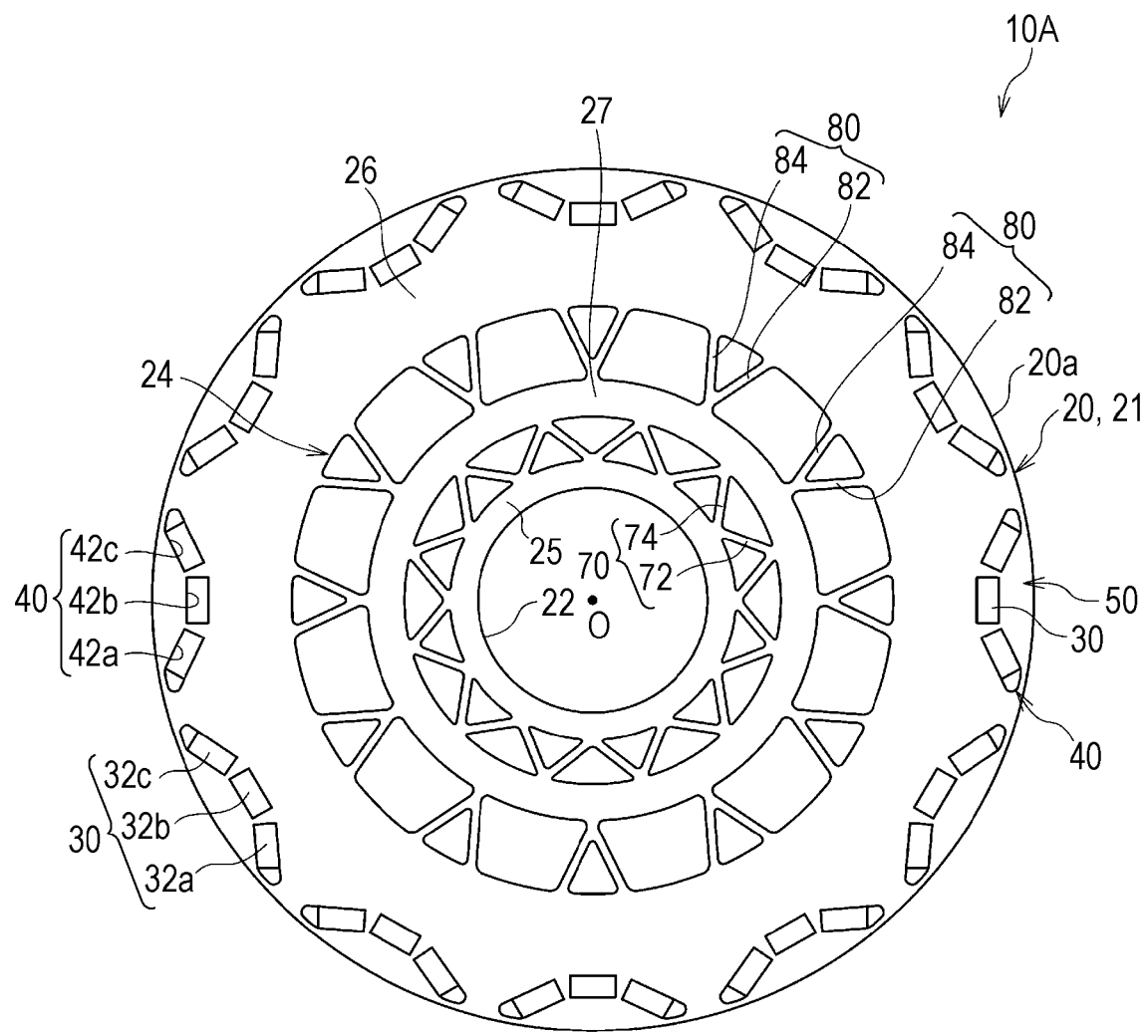
FIG. 7 is a front view of a rotor according to a second embodiment.
Figure 8:
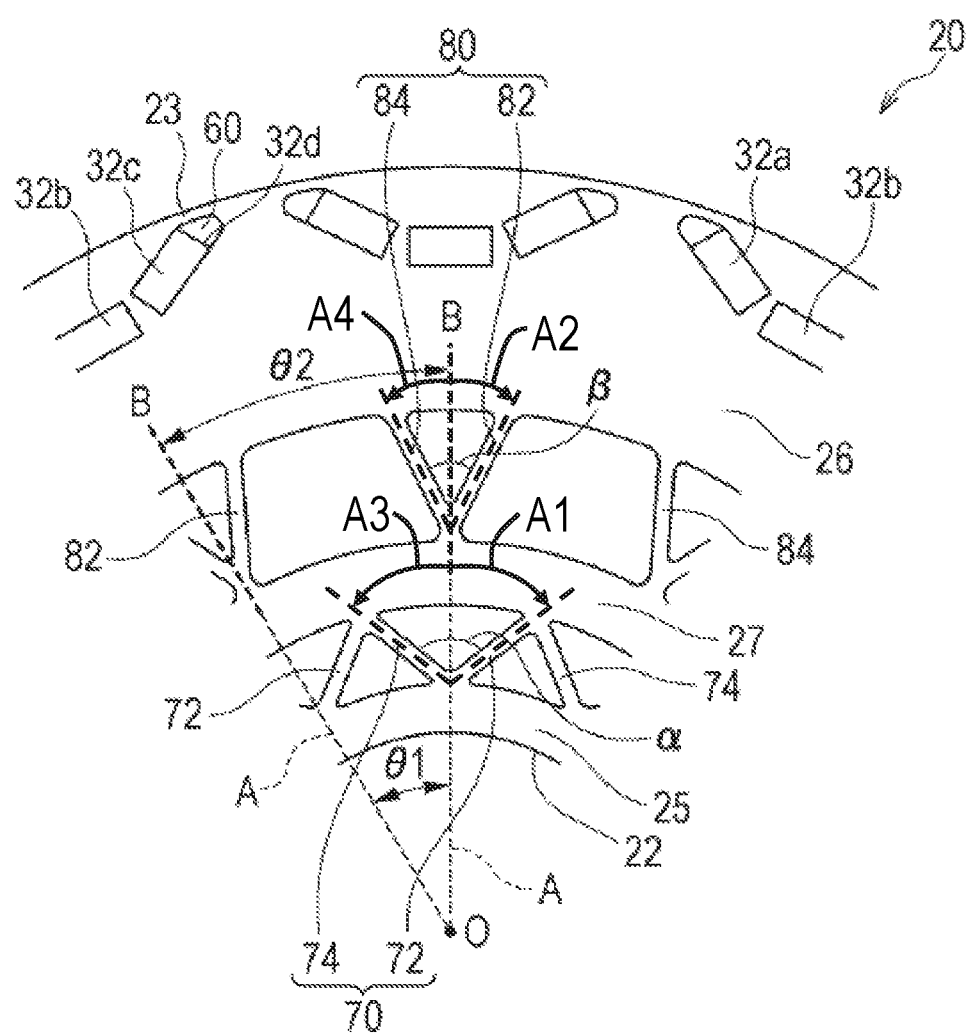
FIG. 8 is a partial enlarged view of the rotor illustrated in FIG. 7.

As illustrated in FIGS. 7 and 8, in the rotor 10A for a rotating electric machine according to the second embodiment, each of the inner circumference-side ribs 70 has a first inner circumference-side rib 72, and a second inner circumference-side rib 74. The first inner circumference-side rib 72 extends to one side in the circumferential direction (clockwise in FIG. 7) at a first inclined angle A1 (as shown, e.g., in FIG. 8) with respect to a radial direction, from the inner circumference-side rotor core 25 toward the annular portion 27. The second inner circumference-side rib 74 extends to the other side in the circumferential direction (counterclockwise in FIG. 7) at a third inclined angle A3 (as shown, e.g., in FIG. 8) with respect to the radial direction, from the inner circumference-side rotor core 25 toward the annular portion 27. Each of the outer circumference-side ribs 80 has a first outer circumference-side rib 82, and a second outer circumference-side rib 84. The first outer circumference-side rib 82 extends to one side in the circumferential direction (clockwise in FIG. 7) at a second inclined angle A2 (as shown, e.g., in FIG. 8) from the annular portion 27 toward the outer circumference-side rotor core 26. The second outer circumference-side rib 84 extends to the other side in the circumferential direction (counterclockwise in FIG. 7) at a fourth inclined angle A4 (as shown, e.g., in FIG. 8), from the annular portion 27 toward the outer circumference-side rotor core 26.

At the connecting position with the annular portion 27, the outer circumference-side end portion of the first inner circumference-side rib 72 is connected and contact-coupled to the outer circumference-side end portion of the second inner circumference-side rib 74 constituting the adjacent inner circumference-side rib 70. Moreover, at the connecting position with the inner circumference-side rotor core 25, the inner circumference-side end portion of the first inner circumference-side rib 72 is connected and contact-coupled to the inner circumference-side end portion of the second inner circumference-side rib 74 constituting the adjacent inner circumference-side rib 70. In this way, the inner circumference-side ribs 70 that are adjacent to each other are arranged with no spacing therebetween in the circumferential direction.

At the connecting position with the annular portion 27, the inner circumference-side end portion of the first outer circumference-side rib 82 is connected and contact-coupled to the inner circumference-side end portion of the second outer circumference-side rib 84 constituting the adjacent outer circumference-side rib 80. Moreover, the outer circumference-side ribs 80 that are adjacent to each other in the circumferential direction are arranged with a predetermined spacing so that the first outer circumference-side rib 82 constituting one outer circumference-side rib 80 and the second outer circumference-side rib 84 constituting the other outer circumference-side rib 80 do not cross each other.

The number of the inner circumference-side ribs 70 and the number of the outer circumference-side ribs 80 are set equal to each other. In addition, the circumferentially middle portion (indicated by a broken line segment A in FIG. 8) of the inner circumference-side ribs 70 and the circumferentially middle portion (indicated by a broken line segment B in FIG. 8) of the outer circumference-side ribs 80 are located at substantially the same position with respect to the circumferential direction. Therefore, with reference to the center O of the rotor core 20, the angular interval θ1 between adjacent inner circumference-side ribs 70 is substantially the same as the angular interval θ2 between adjacent outer circumference-side ribs 80 (θ1=θ2).

The included angle α formed by the first inner circumference-side rib 72 and the second inner circumference-side rib 74 is set larger than the included angle β formed by the first outer circumference-side rib 82 and the second outer circumference-side rib 84 (α>β). Therefore, the outer circumference-side ribs 80 have a higher rigidity than the inner circumference-side ribs 70 against a pulling force directed toward the outer circumference side.

Figure 9:
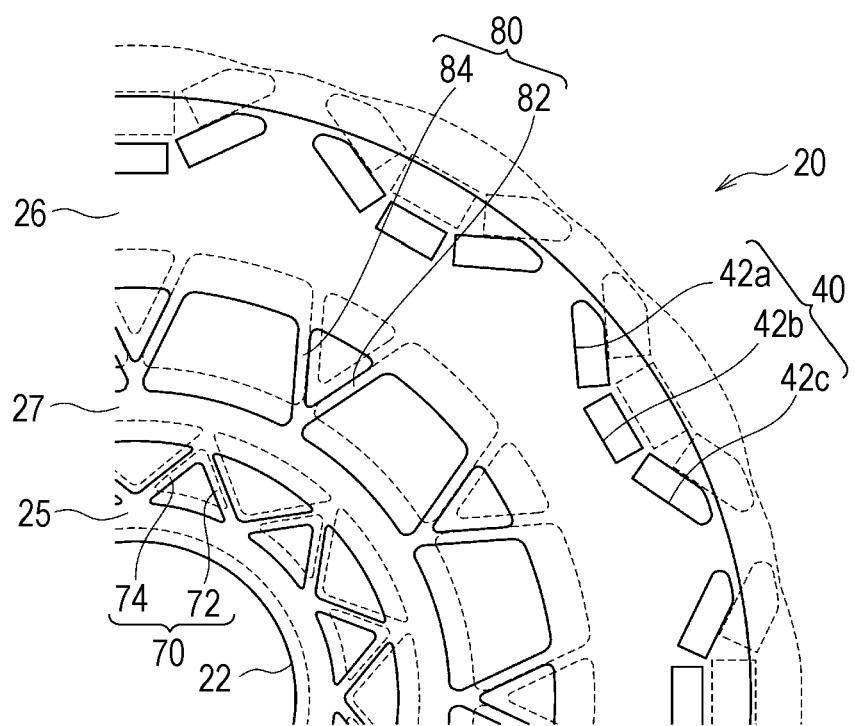
FIG. 9 illustrates displacement of a rotor core according to the second embodiment.

FIG. 9 illustrates the results obtained by simulation for displacement of the rotor core 20 according to the second embodiment during rotation. In FIG. 9, solid lines indicate the rotor core 20 before rotation, and broken lines indicate the rotor core 20 during rotation.

Referring also to FIG. 6, as in the first embodiment, in the rotor core 20 according to the second embodiment, bulging of each of the inner circumference-side rotor core 25 and the outer circumference-side rotor core 26 to the outer circumference side is reduced in a well-balanced manner, in comparison to Comparative Examples 1 and 2.

More specifically, it is appreciated that bulging of the outer circumferential surface of the outer circumference-side rotor core 26 to the outer circumference side is such that Second Embodiment a Comparative Example 2<First Embodiment<Comparative Example 1. This is because in the second embodiment, the inner circumference-side ribs 70 have a relatively high rigidity owing to their so-called spoke configuration, and thus bulging of the outer circumference-side rotor core 26 is reduced.

Bulging of the inner circumference-side rotor core 25 to the outer circumference side is such that First Embodiment<Comparative Example 1<Second Embodiment<Comparative Example 2. This is due to the following reason. That is, in the second embodiment, in comparison to the first embodiment, the inner circumference-side ribs 70 are less likely to deform under a force that pulls the outer circumference-side rotor core 26 and the annular portion 27 toward the outer circumference side. Therefore, the centrifugal force that acts on each of the outer circumference-side rotor core 26 and the annular portion 27 during rotation is transmitted to the inner circumference-side rotor core 25, making the inner circumference-side rotor core 25 more likely to bulge to the outer circumference side. However, the amount of bulging of the inner circumference-side rotor core 25 is significantly reduced in comparison to Comparative Example 2, and is an allowable value.

Third Embodiment

Next, a rotor for a rotating electric machine according to a third embodiment will be described. A rotor 10B for a rotating electric machine according to the third embodiment has the same basic configuration as the second embodiment, and differs from the second embodiment in the configurations of the inner circumference-side ribs 70 and outer circumference-side ribs 80. Accordingly, the same portions are denoted by the same symbols to omit or simplify the description of those portions.

Figure 10:
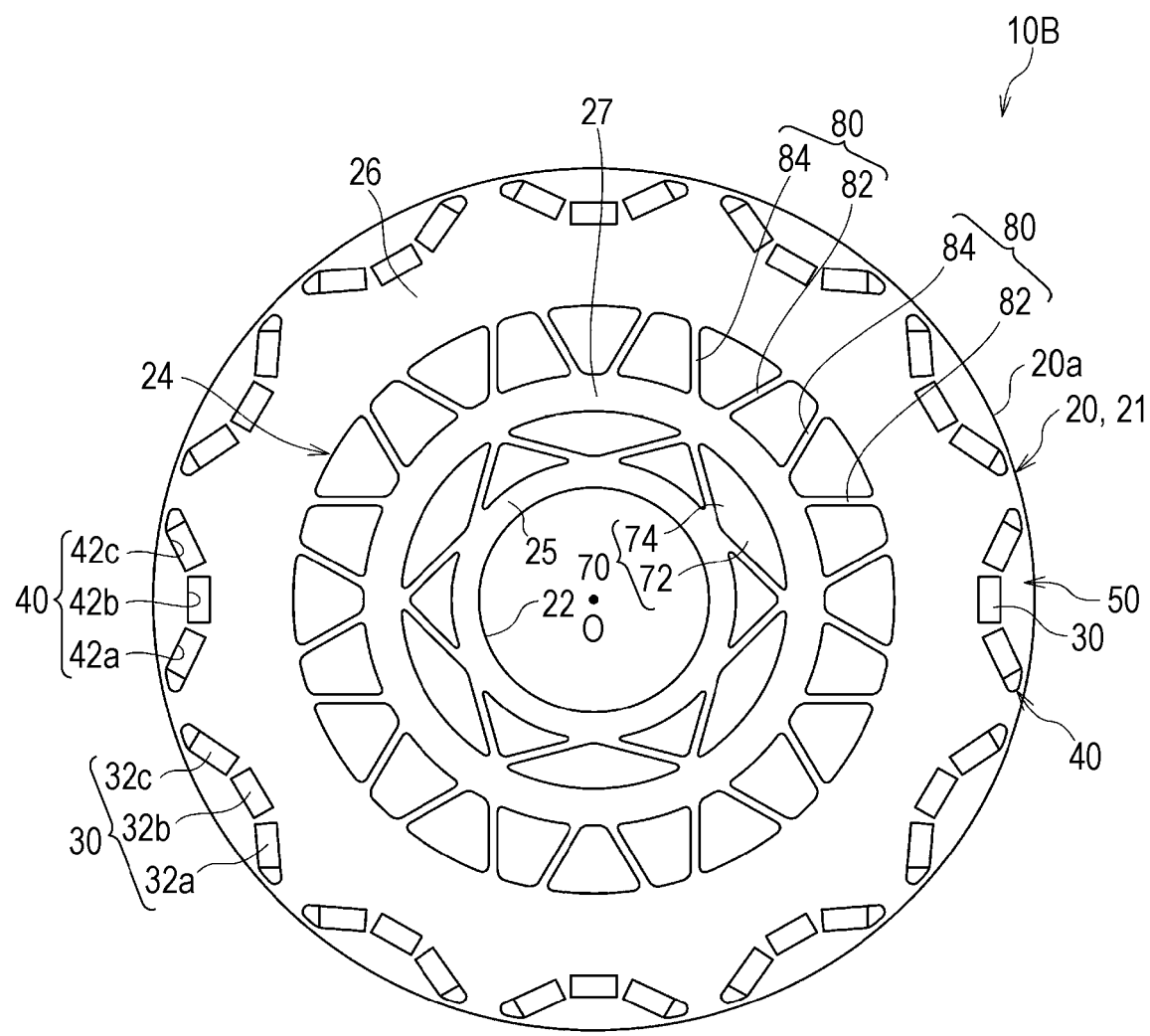
FIG. 10 is a front view of a rotor according to a third embodiment.
Figure 11:
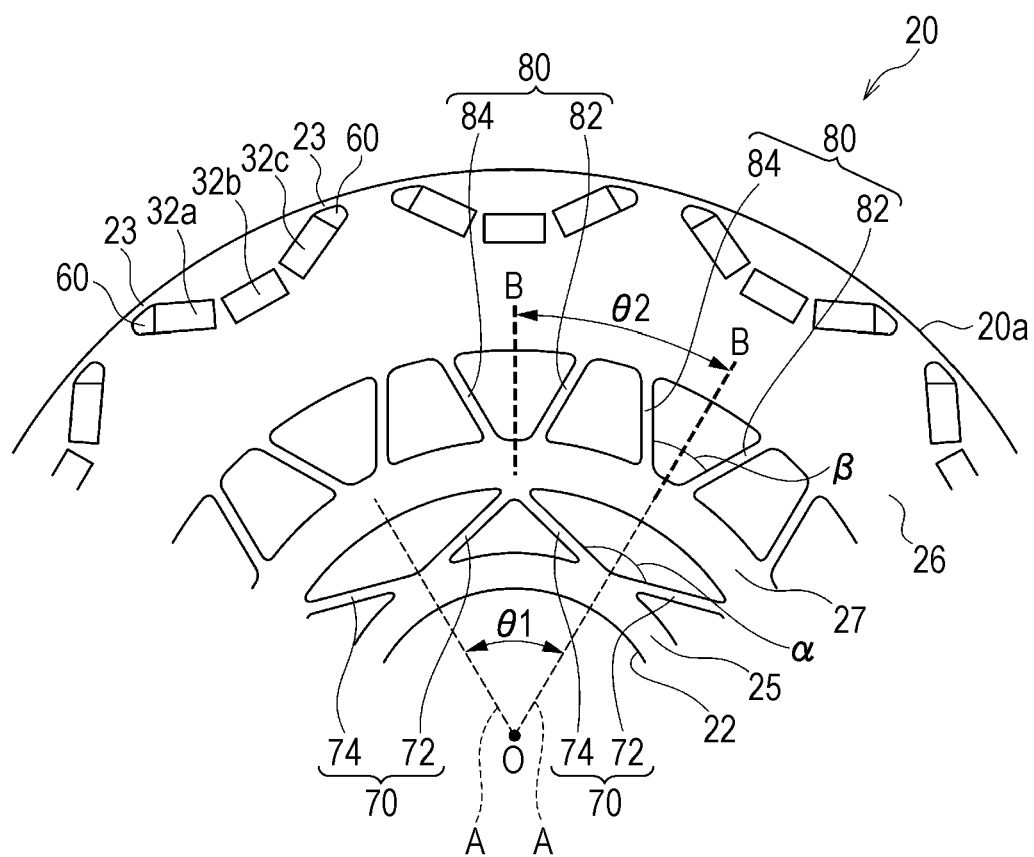
FIG. 11 is a partial enlarged view of the rotor illustrated in FIG. 10.

As illustrated in FIGS. 10 and 11, as in the second embodiment, in the third embodiment, the included angle α formed by the first inner circumference-side rib 72 and the second inner circumference-side rib 74 is set larger than the included angle β formed by the first outer circumference-side rib 82 and the second outer circumference-side rib 84 (α>β).

Further, in the third embodiment, the number of the outer circumference-side ribs 80 is set to twice the number of the inner circumference-side ribs 70. Consequently, with reference to the center O of the rotor core 20, the angular interval θ1 between adjacent inner circumference-side ribs 70 is twice the angular interval θ2 between adjacent outer circumference-side ribs 80 (θ1=2×θ2). Therefore, the rigidity of the inner circumference-side ribs 70 against a pulling force directed toward the outer circumference side decreases in comparison to the second embodiment.

Figure 12:
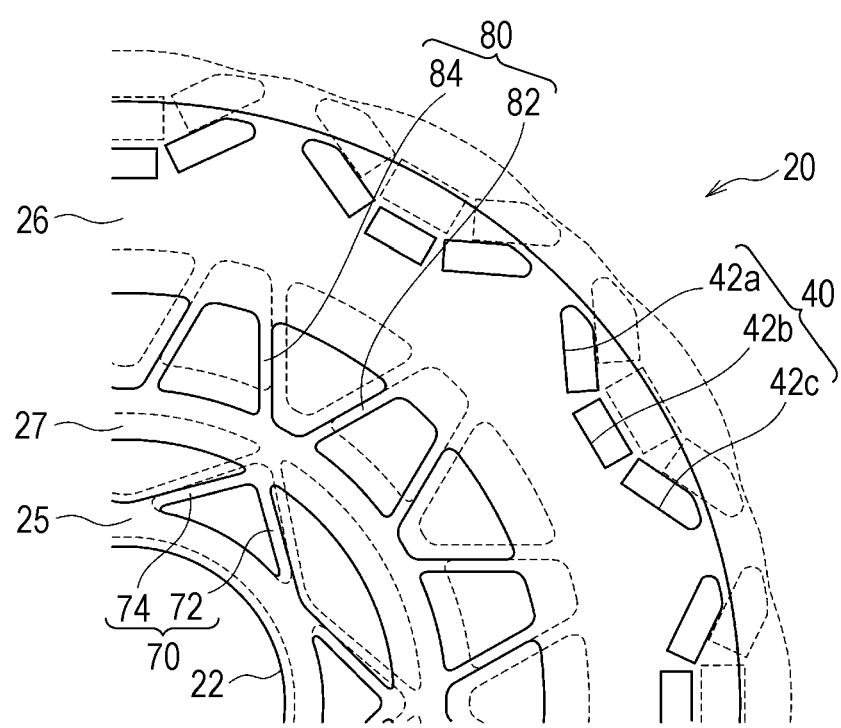
FIG. 12 illustrates displacement of a rotor core according to the third embodiment.
Figure 13:
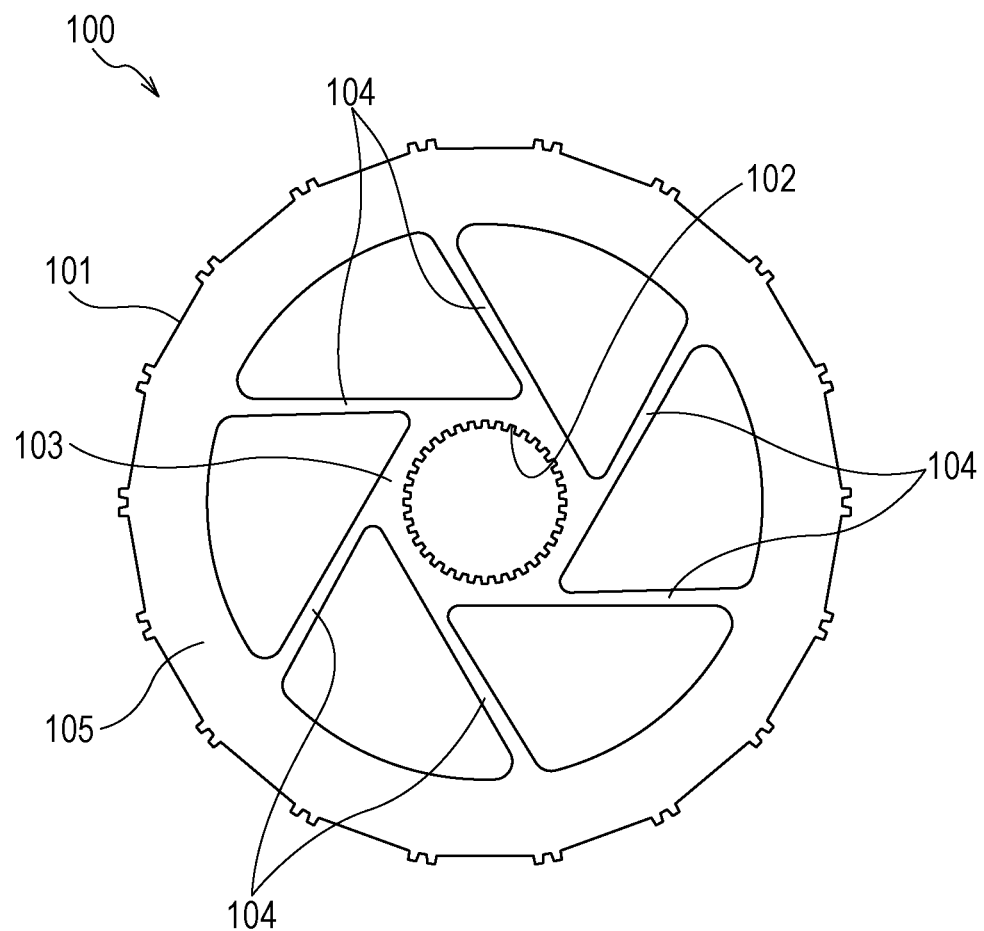
FIG. 13 is a front view of a rotor described in Japanese Patent No. 3746885.
Figure 14:
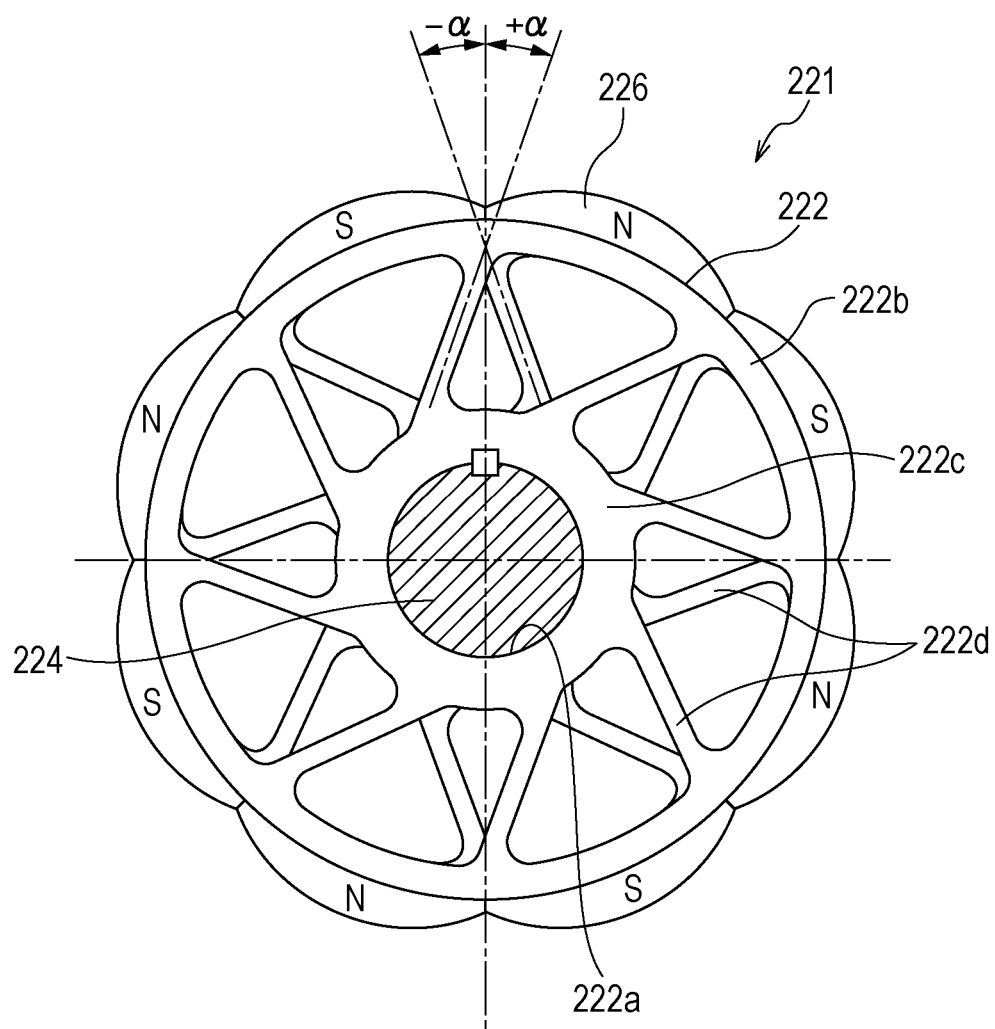
FIG. 14 is a front view of a rotor described in Japanese Unexamined Patent Application Publication No. 2004-194419.

FIG. 12 illustrates the results obtained by simulation for displacement of the rotor core 20 according to the third embodiment during rotation. In FIG. 12, solid lines indicate the rotor core 20 before rotation, and broken lines indicate the rotor core 20 during rotation.

Referring also to FIG. 6, as in the first embodiment, in the rotor core 20 according to the third embodiment, bulging of each of the inner circumference-side rotor core 25 and the outer circumference-side rotor core 26 to the outer circumference side is reduced in a well-balanced manner, in comparison to Comparative Examples 1 and 2.

In particular, in the third embodiment, by setting the angular interval θ1 between adjacent inner circumference-side ribs 70 to twice the angular interval θ2 between adjacent outer circumference-side ribs 80, the rigidity of the inner circumference-side ribs 70 is reduced in comparison to the second embodiment. Consequently, the inner circumference-side ribs 70 readily undergo deformation under a force that pulls the outer circumference-side rotor core 26 and the annular portion 27 toward the outer circumferential side. Therefore, the centrifugal force that acts on the outer circumference-side rotor core 26 and the annular portion 27 during rotation is less likely to be transmitted to the inner circumference-side rotor core 25, thereby effectively reducing bulging of the inner circumference-side rotor core 25.

It is to be understood that as long as the angular interval θ1 between adjacent inner circumference-side ribs 70 is set larger than the angular interval θ2 between adjacent outer circumference-side ribs 80 with reference to the center O of the rotor core 20 (θ1>θ2), the relationship between these angular intervals θ1 and θ2 can be set in an arbitrary manner. It is possible to reduce the bulging of each of the outer circumference-side rotor core 26 and the inner circumference-side rotor core 25 to an appropriate value by adjusting the deformability (rigidity) of the inner circumference-side ribs.

It is to be understood that the rotor 10 for a rotating electric machine according to the present disclosure is not limited to the above-mentioned embodiment but various modifications, improvements, and the like can be made as appropriate.

For example, the configuration of the rotor core 20 is not limited as long as the following conditions are met: the annular portion 27 having a substantially annular shape is formed inside the through-hole 24; the inner circumference-side rotor core 25 and the annular portion 27 are connected by the plurality of inner circumference-side ribs 70 arranged at predetermined intervals in the circumferential direction; and the outer circumference-side rotor core 26 and the annular portion 27 are connected by the plurality of outer circumference-side ribs 80 arranged at predetermined intervals in the circumferential direction.

The above-mentioned configuration allows the respective shapes and/or positioning of the inner circumference-side ribs 70 and the outer circumference-side ribs 80 to be set independently from each other, thereby making it possible to set the respective rigidities of the inner circumference-side ribs and outer circumference-side ribs to desired characteristics. Therefore, it becomes easy to control each of the following magnitudes: the press-fit stress generated in the interior of the rotor core 20 when the rotating shaft is press-fitted into the shaft hole 22; the centrifugal stress generated in the interior of the rotor core 20 owing to the centrifugal force applied during rotation of the rotor; and bulging of each of the inner circumference-side rotor core 25 and the outer circumference-side rotor core 26 caused by the press-fit stress and the centrifugal stress, to fall within a range that meets predetermined conditions.

According to a first aspect of the present disclosure, there is provided a rotor (for example, a rotor 10, 10A, or 10B according to each of the embodiments described above) for a rotating electric machine, the rotor including a rotor core (for example, a rotor core 20 according to the embodiments described above) that has a substantially annular shape, the rotor core having a plurality of magnet insertion holes (for example, magnet insertion holes 40 according to the embodiments described above) that are formed at predetermined intervals in a circumferential direction, a permanent magnet (for example, a permanent magnet 30 according to the embodiments described above) that is inserted into each of the magnet insertion holes, and a rotating shaft that is press-fitted into a shaft hole (for example, a shaft hole 22 according to the embodiments described above) formed in a central portion of the rotor core. The rotor core has a through-hole (for example, a through-hole 24 according to the embodiments described above) that is located on an inner circumference side of the magnet insertion holes, the through-hole having a substantially annular shape and penetrating the rotor core in an axial direction, an inner circumference-side rotor core (for example, an inner circumference-side rotor core 25 according to the embodiments described above) that is located on an inner circumference side of the through-hole, and an outer circumference-side rotor core (for example, an outer circumference-side rotor core 26 according to the embodiments described above) that is located on an outer circumference side of the through-hole. The rotor core further has an annular portion (for example, an annular portion 27 according to the embodiments described above) having a substantially annular shape, the annular portion being formed inside the through-hole. The inner circumference-side rotor core and the annular portion are connected by a plurality of inner circumference-side ribs (for example, inner circumference-side ribs 70 according to the embodiments described above) that are arranged at predetermined intervals in the circumferential direction. The outer circumference-side rotor core and the annular portion are connected by a plurality of outer circumference-side ribs (for example, outer circumference-side ribs 80 according to the embodiments described above) that are arranged at predetermined intervals in the circumferential direction.

According to the first aspect of the present disclosure, the annular portion having a substantially annular shape is formed inside the through-hole of the rotor core, the inner circumference-side rotor core and the annular portion are connected by the plurality of inner circumference-side ribs that are arranged at predetermined intervals in the circumferential direction, and the outer circumference-side rotor core and the annular portion are connected by the plurality of outer circumference-side ribs that are arranged at predetermined intervals in the circumferential direction. Therefore, it is possible to set the respective shapes and/or positioning of the inner circumference-side ribs and the outer circumference-side ribs independently from each other, thereby making it possible to set the respective rigidities of the inner circumference-side ribs and outer circumference-side ribs to desired characteristics. As a result, it becomes easy to control each of the following magnitudes: the press-fit stress generated in the interior of the rotor core when the rotating shaft is press-fitted into the shaft hole; the centrifugal stress generated in the interior of the rotor core owing to the centrifugal force applied during rotation of the rotor; and bulging of each of the inner circumference-side rotor core and the outer circumference-side rotor core caused by the press-fit stress and the centrifugal stress, to fall within a range that meets predetermined conditions.

In a second aspect of the present disclosure, in addition to the configuration according to the first aspect, the outer circumference-side ribs have a higher rigidity against pulling toward the outer circumference side, than a rigidity of the inner circumference-side ribs against pulling toward the outer circumference side.

According to the second aspect of the present disclosure, because the outer circumference-side rotor core is located more circumferentially outwards than the inner circumference-side rotor core, a larger centrifugal force than that acting on the inner circumference-side rotor core acts on the outer circumference-side rotor core. However, by making the rigidity of the outer circumference-side ribs connected to the outer circumference-side rotor core higher than the rigidity of the inner circumference-side ribs, it is possible to reduce bulging of the outer circumference-side rotor core during rotation, and reduce centrifugal force generated in the outer circumference-side rotor core. The relatively large centrifugal force generated in the outer circumference-side rotor core is transmitted to the annular portion via the outer circumference-side ribs that have a relatively high rigidity. In addition, a larger centrifugal force than that acting on the inner circumference-side rotor core also acts on the annular portion itself. At this time, because the inner circumference-side ribs connecting the annular portion and the inner circumference-side rotor core have a rigidity lower than the rigidity of the outer circumference-side ribs, the inner circumference-side ribs readily deform under a force that pulls the outer circumferential portion and the annular portion toward the outer circumference side. Therefore, the relatively large centrifugal force acting on each of the outer circumference-side rotor core and the annular portion is less likely to be transmitted to the inner circumference-side rotor core, thereby reducing bulging of the inner circumference-side rotor core. As a result, bulging of the shaft hole is reduced, thereby making it possible to reduce a decrease in slip torque. When the rotating shaft is press-fitted into the shaft hole, the inner circumference-side ribs have a lower rigidity and more readily deform than the outer circumference-side ribs, press-fit displacement is absorbed by the inner circumference-side ribs, and press-fit stress generated in the inner circumference-side rotor core is less likely to be transmitted to the annular portion and the outer circumference-side rotor core via the inner circumference-side ribs. Therefore, it is possible to reduce press-fit stress generated in the outer circumference-side rotor core.

In a third aspect of the present disclosure, in addition to the configuration according to the first aspect, the inner circumference-side ribs extend to one side in the circumferential direction, from the inner circumference-side rotor core toward the annular portion, and each of the outer circumference-side ribs has a first outer circumference-side rib (for example, a first outer circumference-side rib 82 according to the embodiments described above) that extends to one side in the circumferential direction, from the annular portion toward the outer circumference-side rotor core, and a second outer circumference-side rib (for example, a first outer circumference-side rib 84 according to the embodiments described above) that extends to another side in the circumferential direction, from the annular portion toward the outer circumference-side rotor core.

According to the third aspect of the present disclosure, the inner circumference-side ribs extend to one side in the circumferential direction, from the inner circumference-side rotor core toward the annular portion. In addition, the first and second outer circumference-side ribs constituting the outer circumference-side ribs have such shapes that extend to one side and the other side, respectively, in the circumferential direction from the annular portion toward the outer circumference-side rotor core, and form a pair with each other. Therefore, the outer circumference-side ribs have a higher rigidity than the inner circumference-side ribs against a pulling force directed toward the outer circumference side. As a result, it is possible to obtain the same effect as that of the second aspect of the present disclosure.

In a fourth aspect of the present disclosure, in addition to the configuration according to the first aspect, each of the inner circumference-side ribs has a first inner circumference-side rib (for example, a first inner circumference-side rib 72 according to the embodiments described above) that extends to one side in the circumferential direction, from the inner circumference-side rotor core toward the annular portion, and a second inner circumference-side rib (for example, a second inner circumference-side rib 74 according to the embodiments described above) that extends to another side in the circumferential direction, from the inner circumference-side rotor core toward the annular portion. Each of the outer circumference-side ribs has a first outer circumference-side rib that extends to one side in the circumferential direction, from the annular portion toward the outer circumference-side rotor core, and a second outer circumference-side rib that extends to another side in the circumferential direction, from the annular portion toward the outer circumference-side rotor core. The first inner circumference-side rib and the second inner circumference-side rib form an included angle (for example, an included angle $\alpha$ according to the embodiments described above) larger than an included angle (for example, an included angle $\beta$ according to the embodiments described above) formed by the first outer circumference-side rib and the second outer circumference-side rib.

According to the fourth aspect of the present disclosure, the included angle formed by the first inner circumference-side rib and the second inner circumference-side rib is set larger than the included angle formed by the first outer circumference-side rib and the second outer circumference-side rib. Therefore, the outer circumference-side ribs have a higher rigidity than the inner circumference-side ribs against a pulling force directed toward the outer circumference side, thereby making it possible to obtain the same effect as that of the second aspect of the present disclosure. Further, because the inner circumference-side ribs have a relatively high rigidity, bulging of the outer circumference-side rotor core is reduced, and centrifugal force acting on the annular portion and the outer circumference-side rotor core can be reduced.

In a fifth aspect of the present disclosure, in addition to the configuration according to the first aspect, each of the inner circumference-side ribs has a first inner circumference-side rib that extends to one side in the circumferential direction, from the inner circumference-side rotor core toward the annular portion, and a second inner circumference-side rib that extends to another side in the circumferential direction, from the inner circumference-side rotor core toward the annular portion. Each of the outer circumference-side ribs has a first outer circumference-side rib that extends to one side in the circumferential direction, from the annular portion toward the outer circumference-side rotor core, and a second outer circumference-side rib that extends to another side in the circumferential direction, from the annular portion toward the outer circumference-side rotor core. With reference to a center (for example, a center O according to the embodiments described above) of the rotor core, the inner circumference-side ribs that are adjacent to each other have an angular interval (for example, an angular interval $\theta 1$ according to the embodiments described above) larger than an angular interval (for example, an angular interval $\theta 2$ according to the embodiments described above) between the outer circumference-side ribs that are adjacent to each other.

According to the fifth aspect of the present disclosure, the angular interval between adjacent inner circumference-side ribs is set larger than the angular interval between adjacent outer circumference-side ribs with reference to the center of the rotor core. Therefore, the outer circumference-side ribs have a higher rigidity than the inner circumference-side ribs against a pulling force directed toward the outer circumference side, thereby making it possible to obtain the same effect as that of the second aspect of the present disclosure.

Further, because the inner circumference-side ribs have a relatively high rigidity, it is possible to obtain the same effect as that of the fourth aspect. Moreover, by setting the angular interval between adjacent inner circumference-side ribs larger than the angular interval between adjacent outer circumference-side ribs, it is possible to adjust the deformability (rigidity) of the inner circumference-side ribs. As a result, it is possible to reduce the bulging of each of the outer circumference-side rotor core and the inner circumference-side rotor core to an appropriate value.

In a sixth aspect of the present disclosure, in addition to the configuration according to the second aspect, the inner circumference-side ribs have a radial width shorter than a radial width of the outer circumference-side ribs.

According to the sixth aspect of the present disclosure, the radial width of the inner circumference-side ribs is set shorter than the radial width of the outer circumference-side ribs. Therefore, during rotation, the inner circumference-side ribs are allowed to readily deform under a force that pulls the outer circumferential portion and the annular portion toward the outer circumference side, while reducing the amount of deformation of the inner circumference-side ribs in the radial direction. As a result, bulging of the inner circumference-side rotor core can be reduced, while reducing bulging of each of the annular portion connected to the inner circumference-side ribs, and the outer circumference-side ribs to thereby reduce bulging of the outer circumference-side rotor core.

Obviously, numerous modifications and variations of the present invention are possible in light of the above teachings. It is therefore to be understood that within the scope of the appended claims, the invention may be practiced otherwise than as specifically described herein.

What is claimed is:

1. A rotor for a rotating electric machine, comprising:
    a rotor core having a substantially annular shape and including a rotation axis around which the rotor core is to be rotated, the rotor core including a shaft hole extending along the rotation axis and a plurality of magnet insertion holes provided at predetermined intervals in a circumferential direction of the rotor core;
    a plurality of permanent magnets provided in the plurality of magnet insertion holes, respectively;
    a rotating shaft press-fitted into the shaft hole provided in the rotor core; and
    the rotor core comprising:
        a through-hole provided on a first inner circumference side of the magnet insertion holes, the through-hole positioned forming a substantially annular shape and penetrating the rotor core along the rotation axis;
        an inner circumference-side rotor core located on a second inner circumference side of the through-hole;
        an outer circumference-side rotor core located on an outer circumference side of the through-hole;
        an annular portion having a substantially annular shape, the annular portion being provided in a radially inner side of inside the through-hole;
        a plurality of inner circumference-side ribs connecting the inner circumference-side rotor core and the annular portion and provided at predetermined intervals in the circumferential direction; and
        a plurality of outer circumference-side ribs connecting the outer circumference-side rotor core and the annular portion and provided at predetermined intervals in the circumferential direction, wherein the plurality of inner circumference-side ribs includes first inner circumference-side ribs that extend outward at a first inclined angle with respect to a radial direction of the rotor core, wherein the plurality of outer circumference-side ribs includes first outer circumference-side ribs that extend outward at a second inclined angle with respect to the radial direction of the rotor core, the first inclined angle being different from the second inclined angle, wherein the plurality of inner circumference-side ribs has a radial width shorter than a radial width of the plurality of outer circumference-side ribs, and wherein the plurality of outer circumference-side ribs have a higher rigidity against pulling toward the outer circumference side, than a rigidity of the plurality of inner circumference-side ribs against pulling toward the outer circumference side.

2. The rotor for a rotating electric machine according to claim 1, wherein:
the plurality of inner circumference-side ribs extend to one side in the circumferential direction, from the inner circumference-side rotor core toward the annular portion; and
each of the plurality of outer circumference-side ribs has
the first outer circumference-side rib that extends to one side in the circumferential direction, from the annular portion toward the outer circumference-side rotor core, and
a second outer circumference-side rib that extends to another side in the circumferential direction, from the annular portion toward the outer circumference-side rotor core.

3. The rotor for a rotating electric machine according to claim 1, wherein:
each of the plurality of inner circumference-side ribs has
the first inner circumference-side rib that extends to one side in the circumferential direction, from the inner circumference-side rotor core toward the annular portion, and
a second inner circumference-side rib that extends to another side in the circumferential direction, from the inner circumference-side rotor core toward the annular portion;
each of the plurality of outer circumference-side ribs has
the first outer circumference-side rib that extends to one side in the circumferential direction, from the annular portion toward the outer circumference-side rotor core, and
a second outer circumference-side rib that extends to another side in the circumferential direction, from the annular portion toward the outer circumference-side rotor core; and
the first inner circumference-side rib and the second inner circumference-side rib form an included angle larger than an included angle formed by the first outer circumference-side rib and the second outer circumference-side rib.

4. The rotor for a rotating electric machine according to claim 1, wherein:
each of the plurality of inner circumference-side ribs has
the first inner circumference-side rib that extends to one side in the circumferential direction, from the inner circumference-side rotor core toward the annular portion, and
a second inner circumference-side rib that extends to another side in the circumferential direction, from the inner circumference-side rotor core toward the annular portion;
each of the plurality of outer circumference-side ribs has
the first outer circumference-side rib that extends to one side in the circumferential direction, from the annular portion toward the outer circumference-side rotor core, and
a second outer circumference-side rib that extends to another side in the circumferential direction, from the annular portion toward the outer circumference-side rotor core; and
with reference to a center of the rotor core, the plurality of inner circumference-side ribs that are adjacent to each other have an angular interval larger than an angular interval between the plurality of outer circumference-side ribs that are adjacent to each other.

5. The rotor for a rotating electric machine according to claim 3, wherein a number of the plurality of inner circumference-side ribs and a number of the plurality of outer circumference-side ribs are set equal to each other.

6. The rotor for a rotating electric machine according to claim 3, wherein:
the inner circumference-side rotor core has first middle portions, and the first inner circumference-side rib extends to one side in the circumferential direction and the second inner circumference-side rib extends to another side in the circumferential direction, from each of the first middle portions toward the annular portion;
the annular portion has second middle portions, and the first outer circumference-side rib extends to one side in the circumferential direction and the second outer circumference-side rib extends to another side in the circumferential direction, from each of the second middle portions toward the outer circumference-side rotor core; and
the first middle portions and the second middle portions are located at substantially a same position with respect to the circumferential direction.

7. The rotor for a rotating electric machine according to claim 1, wherein the first inclined angle is greater than the second inclined angle.

8. The rotor for a rotating electric machine according to claim 1,
wherein the first inner circumference-side ribs extend outward at the first inclined angle in a first circumferential direction about the rotor core, and
wherein the first outer circumference-side ribs extend outward at the second inclined angle in the first circumferential direction about the rotor core.

9. The rotor for a rotating electric machine according to claim 1,
wherein the plurality of inner circumference-side ribs includes second inner circumference-side ribs that extend outward at a third inclined angle with respect to a radial direction of the rotor core, the third inclined angle being identical in magnitude to the first inclined angle, the second inner circumference-side ribs extending outward at the third inclined angle in a circumferential direction about the rotor core that is opposite to the first inclined angle of the first inner circumference-side ribs.

10. The rotor for a rotating electric machine according to claim 1,
wherein the plurality of outer circumference-side ribs includes second outer circumference-side ribs that extend outward at a fourth inclined angle with respect to a radial direction of the rotor core, the fourth inclined angle being identical in magnitude to the second inclined angle, the second outer circumference-side ribs extending outward at the fourth inclined angle in a circumferential direction about the rotor core that is opposite to the second inclined angle of the first outer circumference-side ribs.

11. The rotor for a rotating electric machine according to claim 1,
   wherein the plurality of inner circumference-side ribs includes second inner circumference-side ribs that extend outward at a third inclined angle with respect to a radial direction of the rotor core, the third inclined angle being identical in magnitude to the first inclined angle, the second inner circumference-side ribs extending outward at the third inclined angle in a first circumferential direction about the rotor core that is opposite to the first inclined angle of the first inner circumference-side ribs, and wherein the plurality of outer circumference-side ribs includes second outer circumference-side ribs that extend outward at a fourth inclined angle with respect to a radial direction of the rotor core, the fourth inclined angle being identical in magnitude to the second inclined angle, the second outer circumference-side ribs extending outward at the fourth inclined angle in a second circumferential direction about the rotor core that is opposite to the second inclined angle of the first outer circumference-side ribs.

12. The rotor for a rotating electric machine according to claim 1,
   wherein each of the plurality of magnet insertion holes comprise three voids formed in a substantially V-shape, and
   wherein each of the plurality of permanent magnets comprise three permanent magnet pieces provided in the three voids.

\* \* \* \* \*